United States Patent [19]

Toyoda et al.

[11] Patent Number: 4,829,329
[45] Date of Patent: May 9, 1989

[54] BRAKE DEVICE FOR A SHUTTER

[75] Inventors: Yasuhiro Toyoda; Tsuyoshi Fukuda, both of Kanagawa, Japan

[73] Assignee: Canon Kabushiki Kaisha, Tokyo, Japan

[21] Appl. No.: 143,112

[22] Filed: Jan. 12, 1988

[30] Foreign Application Priority Data

| Jan. 14, 1987 | [JP] | Japan | 62-6342 |
| Jan. 14, 1987 | [JP] | Japan | 62-6343 |
| Jan. 14, 1987 | [JP] | Japan | 62-4287[U] |

[51] Int. Cl.$^4$ .............................................. G03B 9/40
[52] U.S. Cl. ..................................... 354/252; 354/246
[58] Field of Search .............. 354/246, 247, 248, 249, 354/252

[56] References Cited

U.S. PATENT DOCUMENTS

| 4,109,266 | 8/1978 | Inoue ................... 354/252 |
| 4,201,459 | 5/1980 | Nakano ................ 354/252 |
| 4,302,091 | 11/1981 | Harase et al. ......... 354/252 |
| 4,692,009 | 9/1987 | Toyoda et al. ........ 354/246 |

*Primary Examiner*—A. A. Mathews
*Attorney, Agent, or Firm*—Fitzpatrick, Cella, Harper & Scinto

[57] ABSTRACT

A brake device of a shutter for braking the shutter nearly at the end of the travel of trailing shutter blades includes a moving member which is provided for the trailing blades and moves accordingly as the trailing blades travel; a brake lever for the trailing blades which comes to abut on the moving member nearly at the end of the movement thereof corresponding to the near end of the travel of the trailing blades, the brake lever being arranged to be pushed to move to some extent by the moving member and to brake the travel of the trailing blades with a load resulting from the movement, the brake lever having at least one tapered portion which is in a wedge-like shape; and load means for loading the tapered portion of the brake lever by coming into sliding contact with the tapered portion being moving, the load means including at least two faces opposed to each other at a distance which decreases in the direction of the movement of the tapered portion, at least one of the two faces being formed with a spring member which is arranged to resiliently deform, so that the load resulting from the movement of the brake lever gradually increases.

23 Claims, 11 Drawing Sheets

F I G. 12
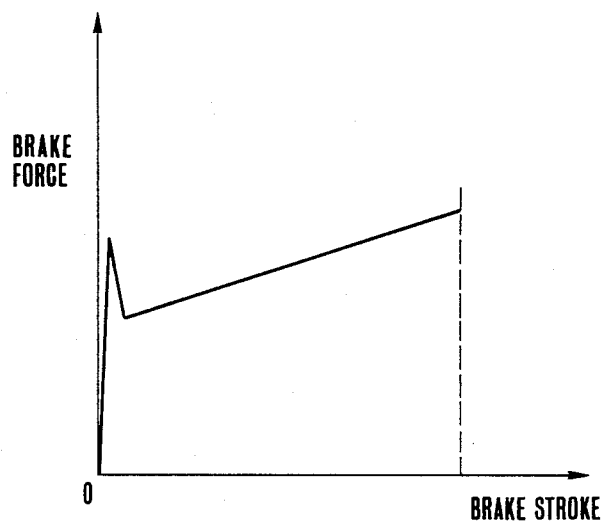
F I G. 13
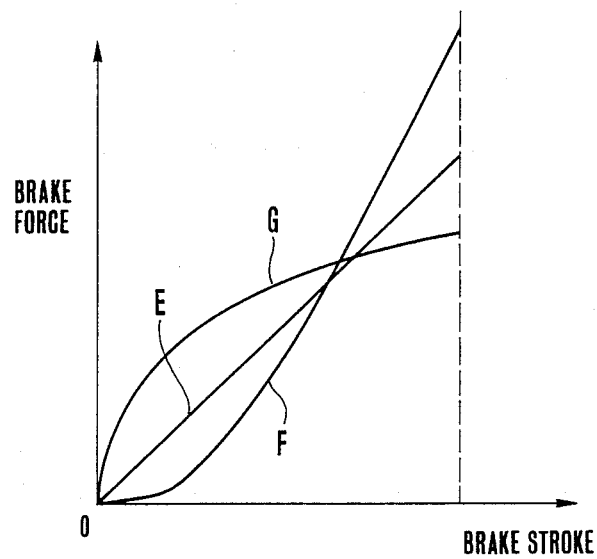

BRAKE DEVICE FOR A SHUTTER

BACKGROUND OF THE INVENTION

1. Field of the Invention

This invention relates to a brake device for a shutter which is arranged to apply the brake to the shutter when a group of shutter blades nearly come to the end of their travel.

2. Description of the Related Art

As a result of a desire to enlarge the region of photography, cameras have recently come to have a highest shutter speed of 1/4000 sec and an X-sync shutter speed of 1/250 sec. In attaining such a high shutter speed, the weight of the shutter blades is reduced and a blade driving spring force is increased for a higher travelling speed of the shutter blades.

The absolute strength of the shutter blades is decreased by the reduction in weight. Despite that, the blades must be driven to travel by an increased driving force. Particularly, at the end of the travel at which the blades achieve their maximum travelling speed, the brake is abruptly applied with a short stroke for bringing them to a stop at a predetermined point. Therefore, a very large force is applied to the blades. Hence, the durability of the blades greatly depends on the brake to be applied at the end of the travel.

In the case of the conventional brake device which is of the kind to obtain braking by friction and is popularly used for the above-stated purpose, the peak of the braking force is obtained at the beginning of the operation of the brake device. However, the slit forming edge of a slit forming trailing blade still remains at the edge of the aperture of the shutter when the brake device beins to operate. Therefore, the blade is warped by the impact of a sudden drop in speed caused by the brake application. This tends to break the shutter with the shutter blade colliding against the aperture edge of the shutter. The breakage of the shutter blade due to such collision is avoidable to a certain degree by initiating brake application after the trailing shutter blade has passed the edge part of the shutter aperture. However, such an arrangement reduces the braking stroke too much for obtaining a sufficient braking effect and also decreases the durability of the shutter.

A brake device which is directed to a solution of the above stated problem is disclosed in U.S. Pat. No. 4,692,009. The brake device is arranged to have first and second brake levers; to apply the brake with a relatively weak force by means of the first lever in the first half of the braking stroke; and to apply brake with a stronger braking force by using both the first and second lever in the latter half of the stroke which takes place after the slit forming shutter blade has passed the edge part of the shutter aperture. However, since the braking force changes by two steps in that instance, the braking force inevitably has two peaks, one at the beginning of the first step and the other at the beginning of the second. That device thus does not permit smooth braking. Therefore, although the brake device is a great improvement over the conventional brake device, the durability of the shutter blades is still affected by that brake device. Although it has been possible to adjust the charateristic curve of the braking force by changing the engaging timing of the first and second levers and the pressed contact pressure of the brake lever on a friction seat, the possible degree of such adjustment has been insufficient.

Meanwhile, a brake device of another type is disclosed in Japanese Utility Model Application Laid-Open No. SHO 60-70832. This brake device is arranged to continuously increase the braking force in proportion to the operating degree of a brake lever. What is claimed by that Japanese utility model application is as follows: "A brake device for a shutter characterized in that: a fixed base plate or an auxiliary member which is guided to be movable only perpendicularly to the base plate and a brake operating member which is arranged to move in parallel to the base plate are arranged to overlap each other; these members are pushed in the perpendicular direction by means of a spring into contact with the base plate through a slanting frictional face; and a braking force which is applied while shutter curtain blades are travelling is gradually increased by changing the pushing pressure of the spring by moving perpendicularly either the brake operating member or the auxiliary member through the action of the slanting face according to the motion of the brake operating member."

SUMMARY OF THE INVENTION

One aspect of this invention is to provide a brake device for a shutter having a leading blade brake which is arranged to exert a large initial braking force on the leading blades of the shutter and a trailing blade brake which is arranged to exert a gradually increasing braking force on the trailing blades of the shutter, so that brake can be reliably put on the leading shutter blades while the trailing shutter blades can be prevented from warping at the beginning of brake application.

The above and other objects and features of the invention will become apparent from the following detailed description of embodiments thereof taken in connection with the accompanying drawings.

BRIEF DESCRIPTION OF THE DRAWINGS

FIG. 12 shows the braking stroke of a leading blade brake in relation to the braking force thereof.

FIG. 13 shows the braking stroke of a trailing blade brake in relation to the braking force thereof.

DETAILED DESCRIPTION OF THE PREFERRED EMBODIMENTS

Figure 1:
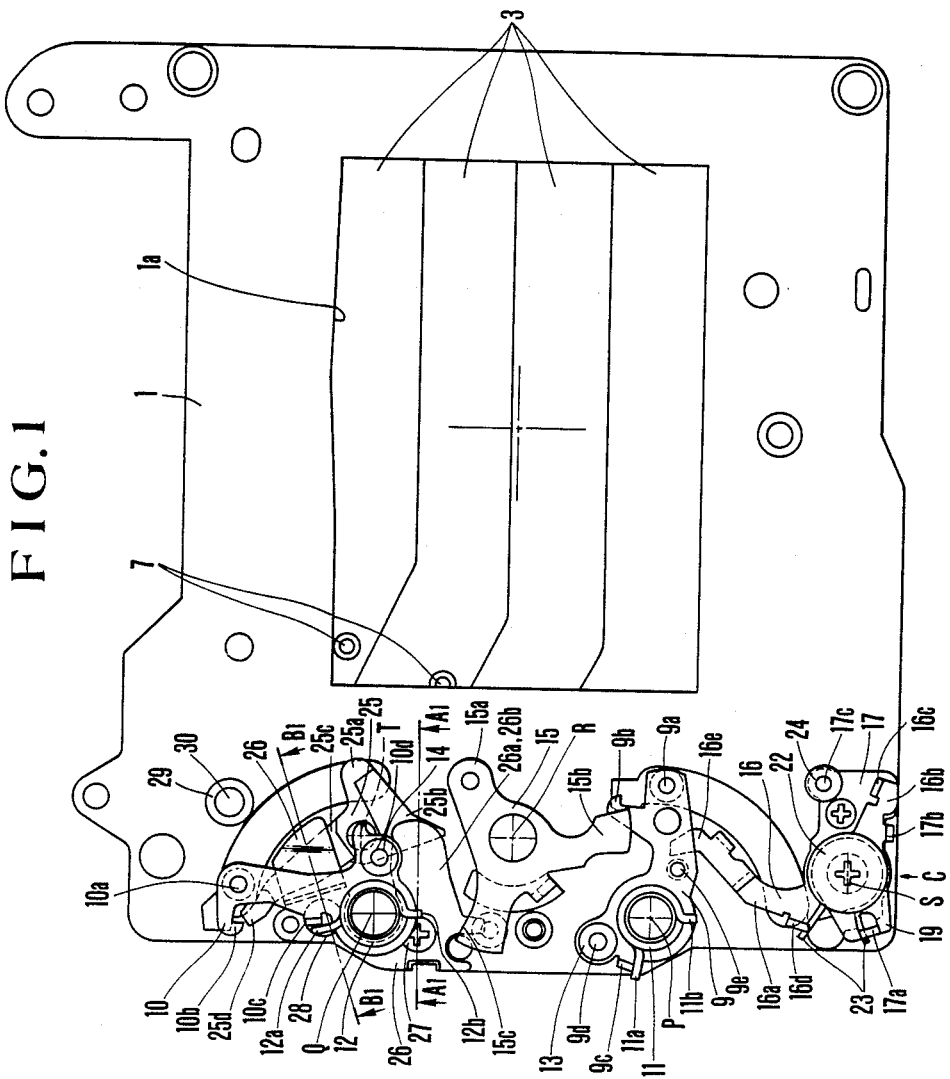
FIG. 1 is a plan view showing a shutter arranged as an embodiment of this invention as in a state of having been completely prepared for a shutter operation.

FIGS. 1 to 15 show an embodiment of this invention. In these drawings, reference numeral 1 denotes a shutter base plate. The base plate 1 has an aperture 1a provided in the middle part thereof. A cover plate 2 is opposed to the shutter base plate 1 with a given clearance maintained between them. The cover plate 2 is provided also with an aperture which is not shown but is formed in a position corresponding to the aperture part 1a. A group of leading blades 3 and a group of trailing blades 4 are interposed in between the shutter base plate 1 and the cover plate 2. The blade groups 3 and 4 are provided with blade arms 5 and 6 for opening and closing the aperture part by operating them with a known link device.

The blades and blade arms are turnably coupled with each other by means of blade dowels 7 and 8. A leading blade driving lever 9 is connected to the leading blade arms 5 by means of a pin 9a and is arranged to shift the position of the leading blade group 3 to open and close the aperture part by turning on a shaft P. The lever 9 has a hook part 9b which is arranged to have the lever 9 locked in a position ready for travelling by a leading blade clamp lever which is not shown. A trailing blade driving lever 10 is connected to the trailing blade arms 6 by means of a pin 10a and is arranged to open and close the aperture part with the trailing blade group 4 by turning on a shaft Q. A hook part 10b of the lever 10 is arranged to have the lever 10 locked in a position ready for travelling by a trailing blade clamp lever which is not shown. Leading and trailing blade driving springs 11 and 12 are arranged to urge the leading and trailing blade driving levers 9 and 10 to turn clockwise on their pivotal shafts with the moving arms 11a and 12a abutting, respectively, on the bent parts 9c and 10c of the levers 9 and 10. Each of the blade groups 3 and 4 is thus arranged to be caused to travel by this urging force. The driving springs 11 and 12 are further provided with fixed arms 11b and 12b which are arranged to permit adjustment of the urging force by an adjustment device.

Leading and trailing shutter blade charging rollers 13 and 14 are rotatably arranged on the shafts 9d and 10d which are erected on the above stated levers 9 and 10, respectively. A charge lever 15 is arranged to be turnable on a shaft R and to receive a force on its arm 15a from a charging mechanism which is not shown. Upon receipt of the force, the charge lever 15 turns clockwise on the shaft R. This clockwise turn of the lever 15 causes the driving levers 9 and 10 to turn counterclockwise against the forces of the driving springs 11 and 12 by pushing the rollers 13 and 14 which are disposed on the driving levers 9 and 10, respectively. Accordingly, the leading and trailing shutter blade groups 3 and 4 are set in their positions to be ready for travelling.

A leading blade brake lever 16 is arranged to be turnable around a shaft S with frictional resistance. The brake lever 16 has an arm part 16a which is arranged to abut on the pin 9a of the leading blade driving lever 9 and thus receives the kinetic energy developed when the leading shutter blade system travels; another arm part 16b which is arranged to receive a buffer effect provided by a stopper rubber 24 at the end of the travel of the leading blades; a bent-up part 16c which is arranged to abut on the stopper rubber 24; and another bent-up part 16d which is arranged to give an auxiliary braking force at the time of brake application and to receive the force of a spring 23 exerted as a brake lever returning force when the shutter is charged.

Figure 4:
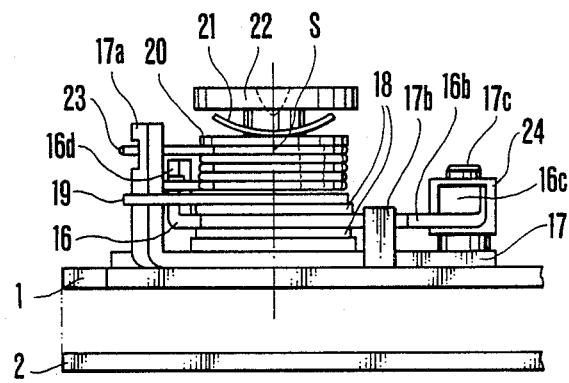
FIG. 4 is a view taken from the direction of an arrow C shown in FIG. 1.
Figure 5:
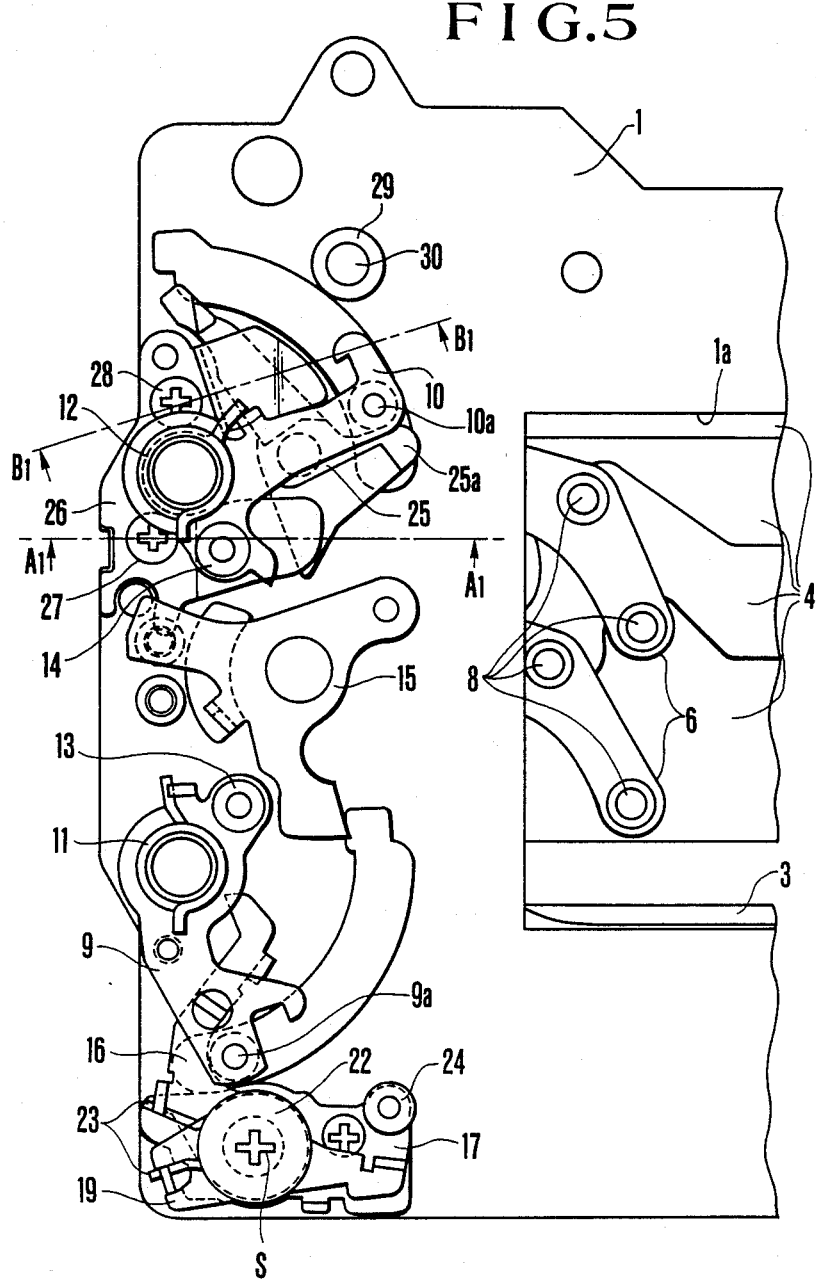
FIG. 5 is a plan view showing the shutter of FIG. 1 as is a state of having its blades come near to the end of their travel.

A leading brake base plate 17 is provided with a bent-up part 17a, which is arranged to carry the leading brake shaft S, and the fixed arm of the spring 23; another bent-up part 17b which defines the maximum set position of the leading blade brake lever 16; and a shaft 17c which is arranged to carry the stopper rubber 24. A brake seat 18 is arranged to give a frictional force by contacting the leading blade brake lever 16. A fixed plate 19 is arranged to stabilize the frictional states of the brake seat 18 and the brake lever 16. A collar 20 is arranged to transmit the pushing force of a leaf spring 21 to the frictional contact faces of the leading blade brake lever 16 and the brake seat 18 and has its outer circumference arranged to serve as a guide rod for guiding the spring 23. The brake leaf spring 21 is arranged to permit adjustment of the braking force by changing its pushing force. A cap screw 22 is arranged to prevent the resilient deformation of the brake leaf spring 21 by pressing it from above as shown in FIG. 4.

A trailing blade brake lever 25 is made of an elastic synthetic resin material and is pushed from above by a leaf spring 26 against the shutter base plate 1. The lever 25 is arranged to be turnable on a shaft T with resistance developed by the urging force resulting from the displacement of the leaf spring 26 and a frictional force. The trailing blade brake lever 25 is provided with an arm part 25a which is arranged to abut on the pin 10a of the trailing blade driving lever 10 and thus to receive a kinetic energy of the trailing blade system when the trailing blade system travels; a tapered portion 25b which is arranged to intrude in between the shutter base plate 1 and the arm parts 26a and 26b of the leaf spring 26 when the brake is applied by the trailing blade brake lever 25; and another tapered portion 25c which is arranged to be pressed by the arm part 26c of the leaf spring 26; an arm 25d which is arranged to receive a buffer effect provided by a stopper rubber 29 at the end of the travel of the trailing shutter blades; and a narrowed part 25e which is provided for the purpose of allowing the arm 25 to readily warp. The leaf spring 26 is secured to the shutter base plate 1 by means of screws 27 and 28. A stopper rubber 29 is provided round the outer circumference of a shaft 30 which is erected on the shutter base plate 1 and serves as a buffer stopper for the trailing blade brake lever 25.

The embodiment which is arranged as described above operates as follows: FIG. 1 shows the shutter as in a state of having completed preparation for letting shutter blades travel. When a start signal is applied to a leading blade controlling magnet arranged as one of shutter time controlling magnets which is not shown, this magnet actuates a leading blade clamp lever which is not shown but is arranged to lock the leading blade driving lever 9 through the hook part 9b. This unlocks the leading blade driving lever 9. The lever 9 is thus allowed to be caused by the urging force of the leading blade driving spring 11 to turn round clockwise on the shaft P. The leading shutter blade group 3 is thus caused to perform an opening action. Then, when a start signal is applied to a trailing blade controlling magnet (not shown) after the lapse of a given period of time, the magnet actuates a trailing blade clamp lever which is not shown but is arranged to lock the trailing blade driving lever 10 through the hook part 10b thereof. The lever 10 is unlocked by this and is allowed to be turned clockwise on the shaft Q by the urging force of the trailing blade driving spring 12. The clockwise turn of the lever 10 causes the trailing blade group 4 to perform a closing action. When the shutter operation comes near to the end of the travel of the blades, the pin 9a of the leading blade driving lever 9 comes to abut on the leading blade brake lever 16. This causes the leading blade brake lever to turn counterclockwise on the shaft S. A braking force is exerted on the leading shutter blade group as shown in FIG. 12 by the frictional force obtained between the brake lever 16 and the brake seat 18 and an elastic force resulting from the displacement of the spring 23. The leading blade group 3 is thus retarded. Following that, the pin 10a of the trailing blade driving lever 10 begins to abut on the arm part 25a of the trailing blade brake lever 25. At that time, the trailing blade brake lever 25 is in a relation to the leaf spring 26 as shown in sectional views in FIGS. 2 and 3 which are taken on lines A1—A1 and B1—B1 of FIG. 1.

Figure 2:
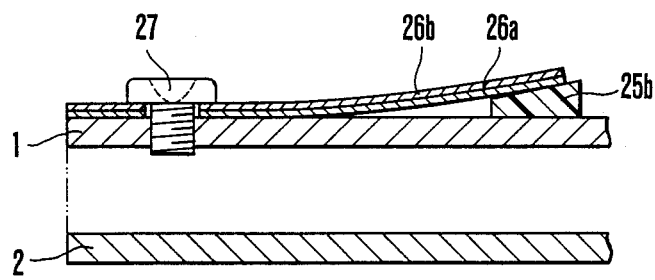
FIG. 2 is a sectional view taken on a line A1—A1 of FIG. 1.
Figure 3:
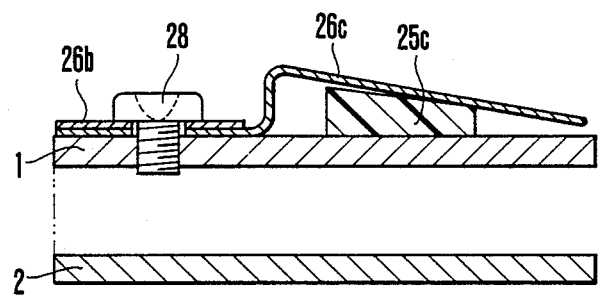
FIG. 3 is a sectional view taken on a line B1—B1 of FIG. 1.
Figure 6:
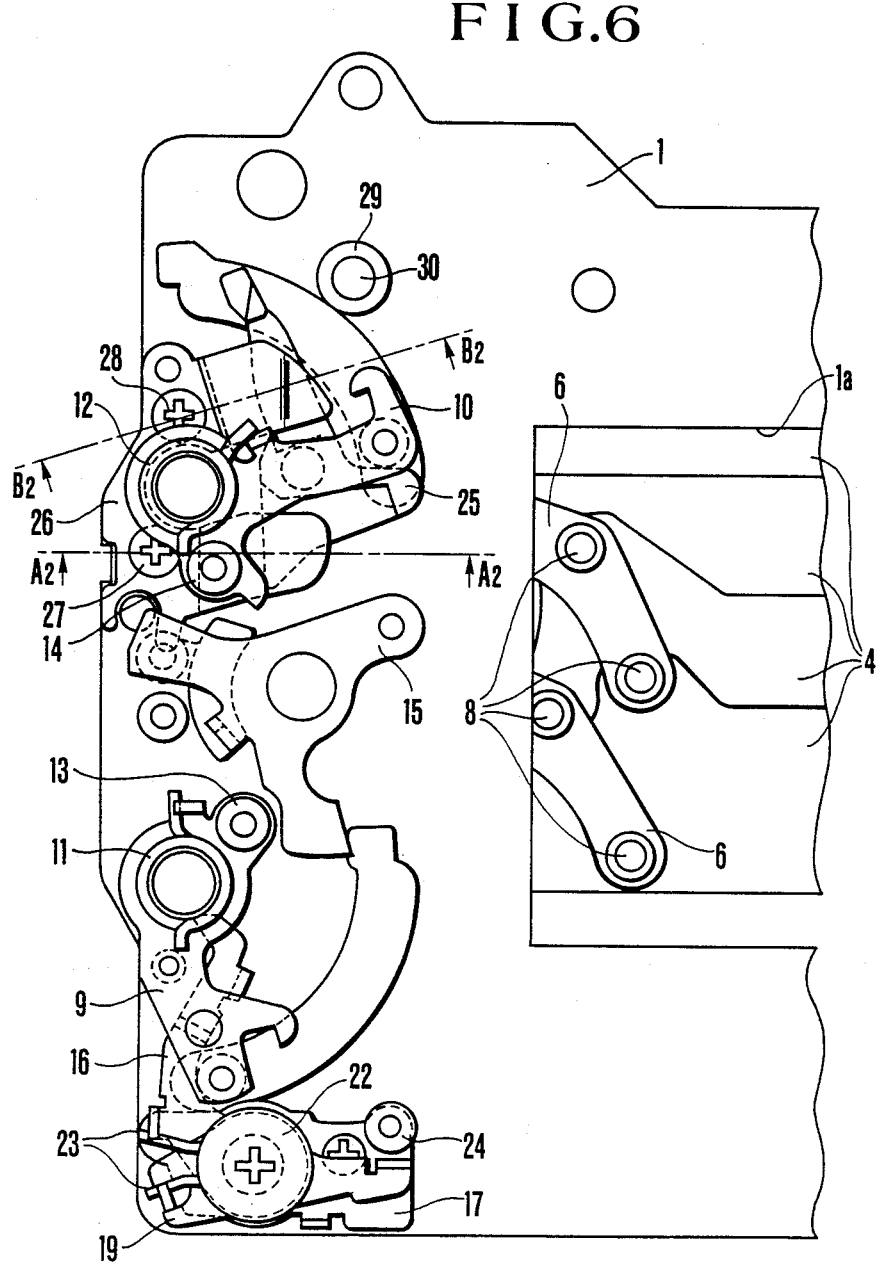
FIG. 6 is a plan view showing the shutter as in a state of having the blades thereof immediately before the end of their travel.
Figure 7:
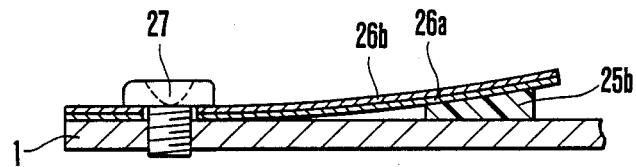
FIG. 7 is a sectional view taken on a line A2—A2 of FIG. 6.
Figure 8:
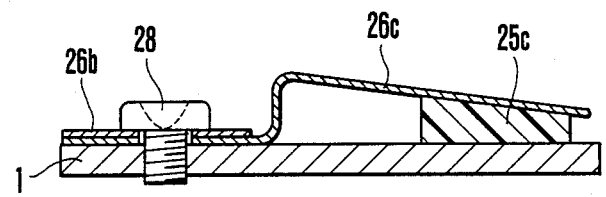
FIG. 8 is a sectional view taken on a line B2—B2 of FIG. 6.

Referring to FIGS. 2 and 3, the tapered portions 25b and 25c of the trailing blade brake lever 25 are pushed against the shutter base plate 1 by relatively weak pushing forces of the arm parts 26a, 26b and 26c of the leaf spring 26 in their initial displaced states. As shown in FIG. 6, when the travel of the blades comes nearer to the end thereof, the leading blade group 3 are further retarded by the leading blade brake. Meanwhile, the trailing blade driving lever 10 causes the trailing blade brake lever 25 to turn clockwise on the shaft Q. The trailing blade group 4 comes to receive a braking force exerted by the frictional force which is obtained between the trailing blade brake lever 25, the leaf spring 26 and the base plate 1 caused by the pushing force of the leaf spring 26. The travel of the trailing blade group 4 is thus retarded. A relation obtained at that time between the trailing blade brake lever 25 and the leaf spring 26 is as shown in FIGS. 7 and 8 which are taken on lines A2—A2 and B2—B2 respectively. Referring to FIGS. 7 and 8, the tapered portions 25b and 25c of the trailing blade brake lever 25 causes the arm parts 26a, 26b and 26c to come to an intermediate point of displacement thus acting in such a way as to push the trailing blade brake lever against the shutter base plate 1 with a pushing force which is larger than in the case of FIGS. 2 and 3.

Figure 10:
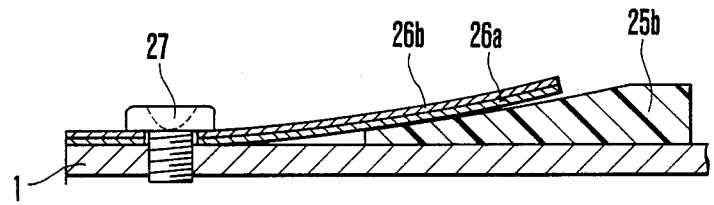
FIG. 10 is a sectional view taken on a line A3—A3 of FIG. 9(a).
Figure 11:
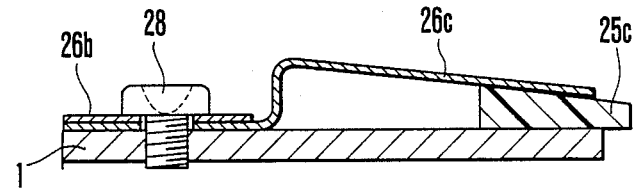
FIG. 11 is a sectional view taken on a line B3—B3 of FIG. 9(a).
Figure 9A:
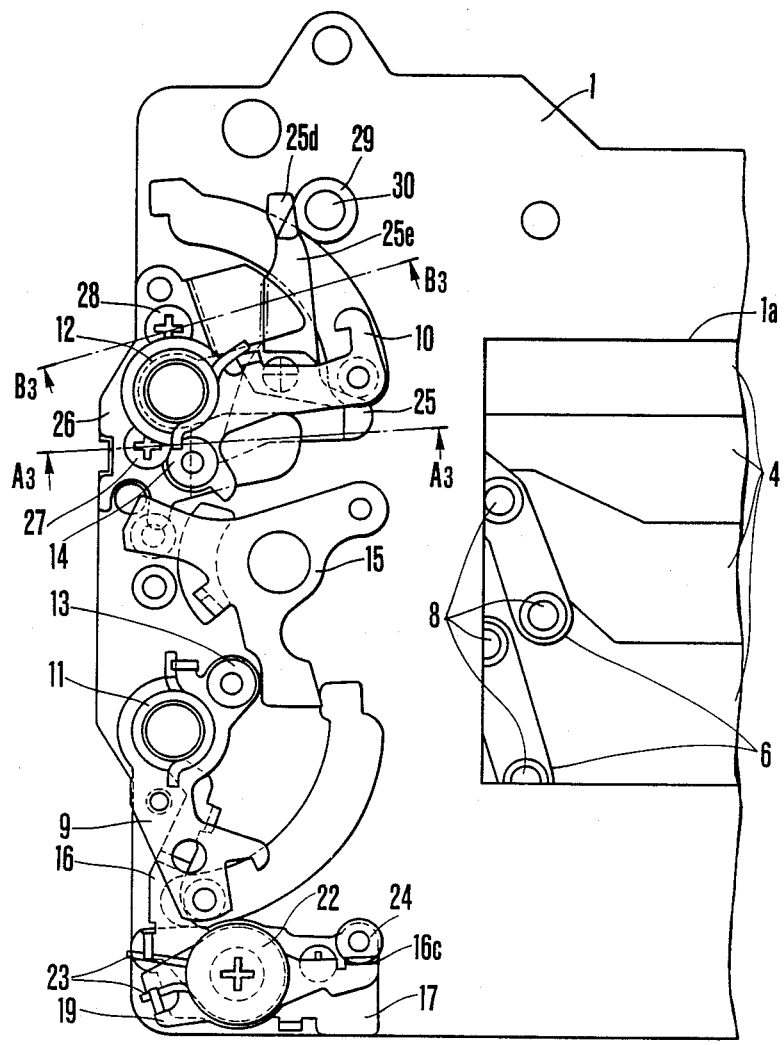
FIG. 9(a) is a plan view showing the shutter of FIG. 1 as in a state of having the shutter blades completed their travel.
Figure 9B:
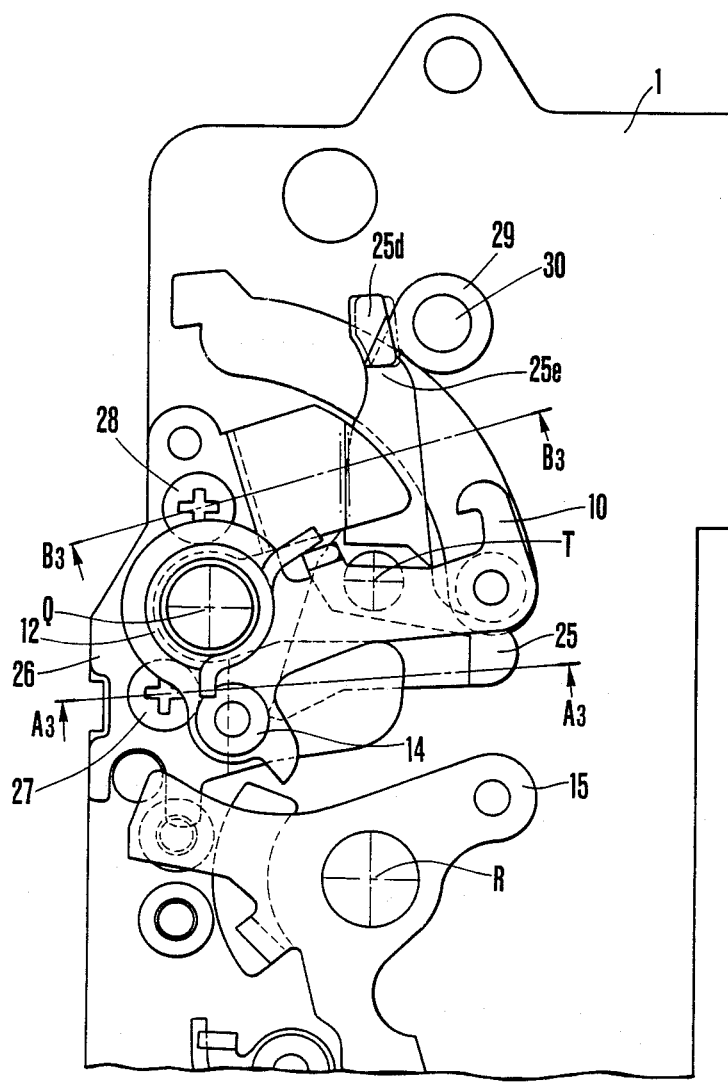
FIG. 9(b) show in an enlarged view the essential parts of FIG. 9(a).

When the travel of the shutter blades comes near to the end thereof as shown in FIG. 9(a), the leading blade driving lever 9 causes the bent-up part 16c of the leading blade brake lever 16 to abut on the stopper rubber 24 which serves as a bufer. Then, the driving lever 9 comes to a stop. At the same time, the travel of the leading blade group 3 comes to an end. Following this, the trailing blade driving lever 10 causes the arm 25d of the trailing blade brake lever 25 to abut on the stopper rubber 29 which also serves as a buffer and the driving lever 10 comes to a stop. At the same time, the travel of the trailing blade group 4 comes to an end. In this instance, if the trailing blade brake lever 25 is made of some rigid material, such as a metal, the arm 25d of the lever 25 would work to an extent as indicated by a two-dot-chain line in the enlarged view of FIG. 9(b). This would increase the degree of deformation of the stopper rubber 29 to place the rubber 29 under a greater load. Whereas, in the case of this embodiment, the trailing blade brake lever 25 is made of a synthetic elastic resin material. In addition to that, the narrowed part 25e is provided in the arm 25d. This arrangement enables the lever 25 to deflect as indicated by a full line in FIG. 9(b), so that a portion of the travelling energy of the blades can be absorbed thereby. Therefore, the stopper rubber 29 is caused to deform to a less degree, so that the load on the rubber 29 can be decreased by the inventive arrangement. FIGS. 10 and 11 which are sectional views taken on lines A3—A3 and B3—B3 show the relation of the trailing blade brake lever 25 to the leaf spring 26. Referring to FIGS. 10 and 11, the tapered portions 25b and 25c of the trailing blade brake lever 25 allows the arm parts 26a, 26b and 26c of the leaf spring 26 to work to their last displacement positions. The leaf spring 26 thus pushes trailing blade brake lever 25 against the shutter base plate 1 with a greater force than the pushing force exerted in the state as shown in FIGS. 7 and 8.

FIG. 13 shows the braking force applied to the pin 10a of the trailing blade driving lever 10 from the beginning to the end of brake application. Braking force curves E, F and G represent different examples of the braking force. As shown, no salient peak of the braking force appears in the initial stage of brake application. The braking force curve is smoothly continuous. Further, it is easy to obtain a linear braking force as represented by the curve E by adjusting the urging force of the leaf spring and the tapered portions 25b and 25c of the trailing blade brake lever 25 which are in contact with the leaf spring 26. Such adjustment also readily enables the shutter to have a braking force which is weak at the beginning and is strong at the end as indicated by the curve F or a braking force which is relatively strong at the beginning and relatively weak at the end as indicated by the curve G. In the case of this specific embodiment, the braking force is set to have the braking force curve F.

Figure 14:
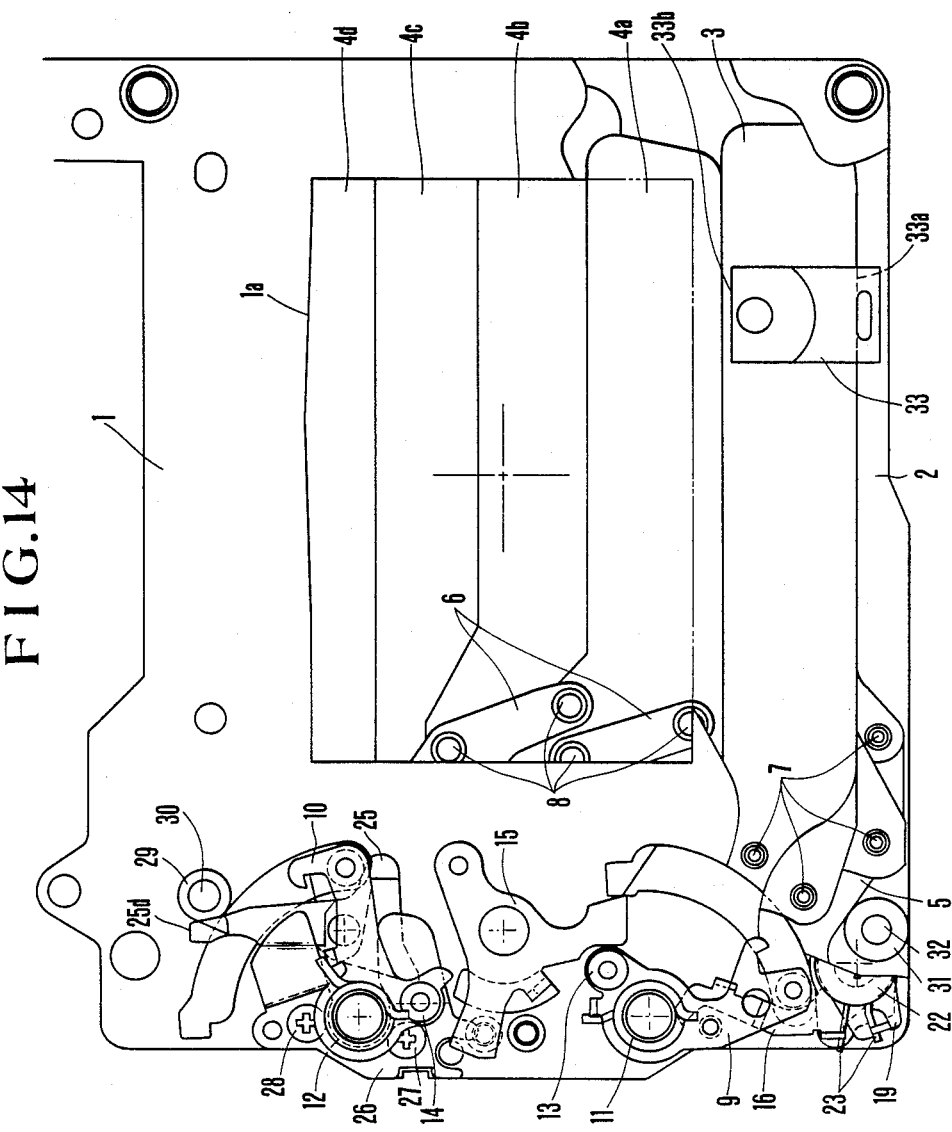
FIG. 14 is a view showing the positions of the blades of the shutter of FIG. 1 obtained at the end of their travel.

The reason for differently arranging the brake of the trailing blade group from that of the leading blade group is as follows: FIG. 14 shows the positions of the shutter blades obtained at the end of the travel of the blades. Referring to FIG. 14, a cover plate carrying post 32 which is arranged to keep the cover plate 2 at an unvarying distance from the shutter base plate 1 also carries a blade arm stopper rubber 31. The stopper rubber 31 is arranged to serve as a buffer for the leading blade group 3 by receiving the end face of the leading blade arm 5 on the outer circumferential surface thereof. A blade stopper rubber 33 is arranged to receive the fore end sides of the leading blades 3 on a part 33a which is indicated by a broken line and the fore end side of the slit forming blade 4a included in the trailing blade group 4 on an upper face part 33b. Therefore, the kinetic energy obtained at the end of the travel of the leading blade group 3 is buffed jointly by the three braking and buffing parts including the leading blade brake, the blade arm stopper rubber 31 and the blade stopper rubber 33 in a balanced manner and, in addition to that, with the blades buffed by the blade stopper in a folded and bundled state. By virtue of this arrangement, the leading blades have a sufficient durability without any reinforcement. Meanwhile, the trailing blade group 4 is in a spread out state at the end of their travel. Among the trailing blade group 4, it is only the slit forming blade 4a that is arranged to have its overrun buffed by the part 33b of the blade stopper rubber 33. It is, therefore, necessary to have all the kinetic energy of the trailing blade group 4 absorbed by the trailing blade brake. A slightest malfunction of the trailing blade brake would greatly lower the durability of the trailing blade group. It is, therefore, difficult to obtain an optimum braking force and an apposite braking force curve to meet the severe requirements for the trailing blade brake. The trailing blade brake thus must be arranged to have the braking force characteristic continuously adjustable.

Figure 15:
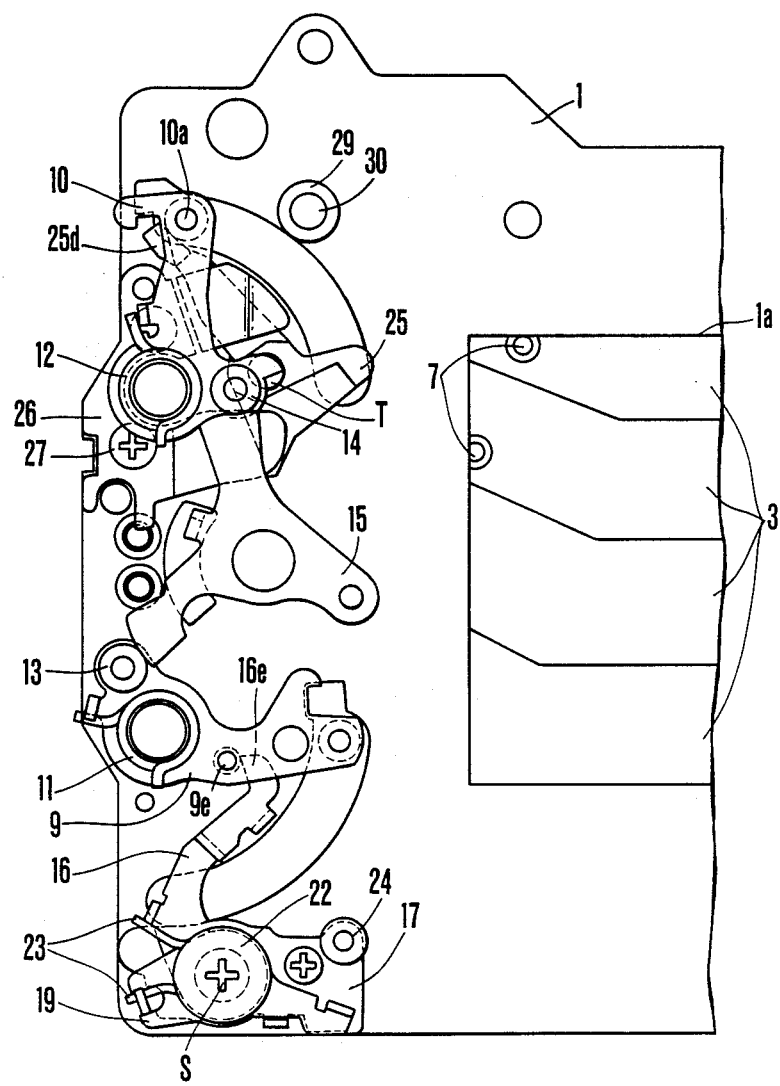
FIG. 15 is a plan view showing the shutter of FIG. 1 as in an over-charged state.
Figure 16A:
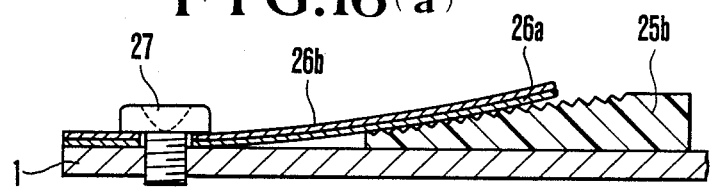
FIGS. 16(a), 16(b), 17(a) and 17(b) are sectional views showing trailing blade brakes arranged in different manners as other embodiments of the invention.
Figure 16B:
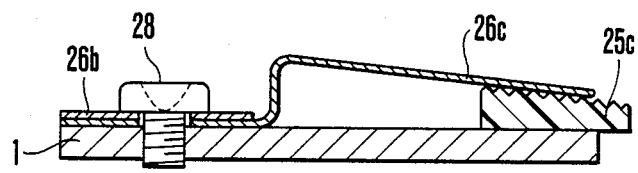
Figure 17A:
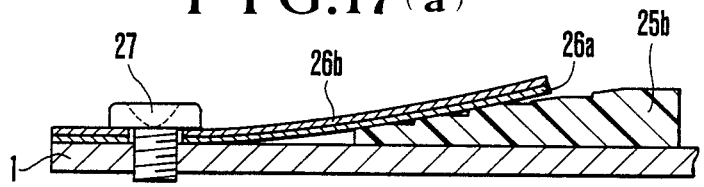
Figure 17B:
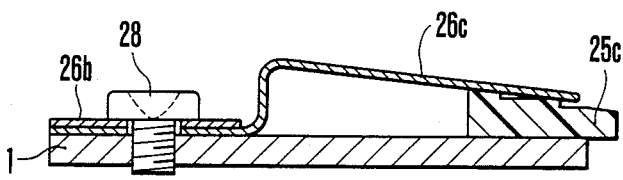

After completion of the travel of the shutter blades, the shutter must be charged into a state of being ready for travel. FIG. 15 shows the shutter in an over-charged state. As mentioned in the foregoing, the clockwise turn of the charge lever 15 causes the leading blade driving lever 9 and the trailing blade driving lever 10 to turn counterclockwise and the shutter is set into a state of being ready for travel. Then, one side face of the fore end 16e of the leading blade brake lever 16 is pushed by the pin 9e disposed on the lower face of the leading blade driving lever 9. This causes the brake lever 16 to turn clockwise on the shaft S and is thus brought into a set state. In this instance, the spring 23 acts to aid the clockwise turn of the leading blade brake lever 16 to mitigate a load imposed on the lever 16 in setting the brake during the shutter charging process.

The trailing blade brake lever 25, on the other hand, has one side face of its fore end 25d pushed by a pin 10a provided on the lower face of the trailing blade driving lever 10. This causes the lever 25 to turn counterclockwise on the shaft T and is thus brought into a set state. In that instance, the leaf spring 26 aids the counterclockwise turn of the trailing blade brake lever 25 by acting on the tapered faces 25b and 25c of the lever 25, so that a load imposed on the lever 25 in setting the brake can be mitigated during the shutter charging process.

In a conceivable method for adjusting the characteristic of the braking force, taking the advantage of the fact that the trailing blade brake lever 25 is made of a synthetic resin material, the friction face of the lever 25 which is to be brought into a frictional contact with the shutter base plate 1 is suitably arranged during the process of forming the lever 25.

In other embodiments, for example, in addition to adjusting the inclination of the tapered portions 25b and 25c mentioned in the foregoing, the frictional contact surface of the lever 25 is unevenly shaped to have peaks and valleys in varied manners as shown in FIGS. 16(a), 16(b), 17(a) and 17(b) in such a way as to vary the state of frictional contact of the surface. Such arrangement permits delicate adjustment in the characteristic of the braking force.

Further, for example, in cases where the inclination of the tapered portions 25b and 25c of the trailing blade brake lever 25 is steepened and the degree of the displacement of the leaf spring 26 which exerts a pushing force during application of the trailing blade brake is increased, the desired pushing force is obtainable without causing any permanent set of fatigue settling by having the leaf spring 26 composed of a plurality of laminated thin leaf springs. Besides, that arrangement also permits adjustment in the pushing force of the leaf spring in accordance with variations in the braking force.

In the embodiment described, the trailing blade brake which has delicate and severe conditions is arranged to include in combination the brake lever which is provided with slanting faces and is made of a synthetic resin material and a leaf spring which is arranged to generate a braking force by applying a pushing force to the slanting faces. The braking force is arranged to be gradually changed (increased) according to the working degree of the brake lever. The arrangement of the trailing blade brake enhances the durability of the shutter blades.

Another advantage of the embodiment resides in that the brake lever which has conventionally been made of a metal material is changed to be made of a synthetic resin material to lessen an impact sound produced when the blade driving lever collides with the braking lever. A further advantage is that charging the shutter, a component of the force of the leaf spring applied to the slanting surface of the brake lever acts to turn round the brake lever into a set state. Therefore, this component of force serves to mitigate the charging load imposed on the brake set. Further, the simple structural arrangement includes only a small number of parts and does not require a large space. The embodiment thus can be easily assembled. The embodiment is advantageous in terms of cost and latitude in designing work.

As shown in FIGS. 2, 7 and 10, the brake device for the trailing shutter blades is arranged to give a braking force by moving the brake lever 25 toward the part of the leaf spring 26 at which the spring 26 is fixed to the shutter base plate 1 by means of the screw 28, like driving a wedge therein. Therefore, the braking force is very weak in the beginning and gradually increases in a conic manner, as represented by the curve F in FIG. 13. The trailing blades thus can be reliably braked with a short braking stroke.

As apparent from the foregoing description, the arrangement of the embodiment gives a brake device which is highly suited for a shutter by virtue of the braking characteristics differently arranged for the leading blades and for the trailing blades.

Another feature of the embodiment resides in that, despite of the relatively large area occupied by the brake device, the shutter unit can be compactly arranged as the brake arrangement for the trailing blades is disposed almost within the region of the turning movement locus of the trailing blade driving lever 10.

Generally, in a bottom travelling shutter as in the case of this embodiment, the brake for the trailing blades is applied near the end of the turning movement of the driving lever. Therefore, the trailing blade driving lever 10 and the charge lever 15 are disposed away from each other leaving some void space between them and the brake is generally arranged within this void space. In the case of the conventional brake device, this arrangement has inevitably resulted in an increase in the size of the shutter unit (an increase in the verical direction as viewed on FIG. 1). Whereas, this embodiment enables the levers 10 and 15 to be disposed close to each other to permit reduction in size of the shutter unit. Further, the brake arrangement for the leading blades is disposed lower than the turning locus region of the leading blade driving lever 9 (as viewed on FIG. 1). The reason for this is that at a point near to the end of the turning movement thereof relative to the travel of the shutter blades, the position of the leading blade driving lever 9 becomes lower (as viewed on FIG. 1) on the opposite side of the charge lever 15. In other words, the lower region of the turning movement of the lever 9 is provided as an area for stowing the leading shutter blade group in a folded state after completion of their travel. Utilization of this region for arranging the leading blade brake, therefore, does not cause any increase in the size of the shutter unit.

As described in the foregoing, the arrangement of the embodiment gives a shutter brake device which permits reduction in size of the shutter unit.

What is claimed is:

1. A brake device of a shutter for braking said shutter nearly at the end of the travel of trailing blades of said shutter, comprising:
   (a) a moving member for said trailing shutter blades, said moving member being arranged to move accordingly as said trailing shutter blades travel;
   (b) a brake lever for said trailing blades which comes to abut on said moving member nearly at the end of the movement thereof corresponding to the near end of the travel of said trailing shutter blades, said brake lever being arranged to be pushed to move to some extent by said moving member and to brake the travel of said trailing shutter blades with a load resulting from said movement, said brake lever having at least one tapered portion which is in a wedge-like shape; and
   (c) load means for loading said tapered portion of said brake lever by coming into sliding contact with said tapered portion being moving, said load means including at least two faces opposed to each other at a distance which decreases in the direction of said movement of said tapered portion, at least one of said two faces being formed with a spring member which is arranged to resiliently deform, so that the load resulting from said movement of said brake lever gradually increases.

2. A device according to claim 1, wherein said moving member is a trailing blade driving lever, said trailing blade driving lever being arranged to be urged to turn round by an urging spring and to drive said trailing shutter blades to travel through a blade arm which carries said trailing shutter blades.

3. A device according to claim 1, wherein said tapered portion of said brake lever is provided with recesses and projections which are arranged in such a manner as to permit adjustment of the loading state resulting from said movement of said brake lever.

4. A device according to claim 1, wherein said spring member included in said load means is formed with a leaf spring and is obliquely disposed along the slanting surface of said tapered portion of said brake lever, said spring member being thus arranged to be in sliding contact with said tapered portion of said brake lever.

5. A device according to claim 4, wherein said leaf spring is formed by laminating a plurality of leaf springs and is thus arranged to reduce the possibility of having a permanent set of fatigue settling due to repeated resilient deformation thereof.

6. A device according to claim 2, wherein said brake lever is made of a synthetic resin material, so that a sound produced when said brake lever collides with said trailing blade driving lever is mitigated.

7. A device according to claim 1, further comprising a stopper which is arranged to have said brake lever come to abut thereon at the end of said movement of said brake lever, a part of said stopper which comes into contact with said brake lever being made of rubber.

8. A device according to claim 7, wherein said brake lever is turnably carried by a pivotal shaft; and a portion of said brake lever located on the side of said shaft and near to a part abutting on said stopper is formed in a narrowed shape, so that kinetic energy produced when said brake lever abuts on said stopper is absorbed.

9. A device according to claim 1, wherein said brake lever is provided with a plurality of tapered portions; and said load means is arranged to correspond to each of said plurality of tapered portions.

10. A brake device of a shutter arranged to brake said shutter nearly at the end of the travel of trailing blades of said shutter, comprising:
    (a) a lever which is arranged to turn in relation to the travel of said trailing shutter blades and in association with the movement of said trailing shutter blades at least slightly before the end of said travel, said lever being arranged to brake the travel of said trailing shutter blade by a load resulting from the turning motion thereof, at least one portion of said lever being arranged to be in a tapered wedge-like shape; and
    (b) load means for loading said lever by coming into sliding contact with said tapered portion of said lever being turning, said load means having at least two confronting faces which are disposed away from each other with a clearance which becomes narrower in the direction of said turning motion, at least one of said two faces being formed with a spring member which is capable of resiliently deforming, such that the load resulting from said turning motion of said lever gradually increases.

11. A brake device of a shutter arranged to brake said shutter nearly at the end of the travel of trailing blades of said shutter, comprising:
    a trailing blade driving lever which turns round in association with the travel of said trailing shutter blades, said driving lever being arranged to be urged to turn round by an urging spring, to be connected to a blade arm which is carrying said trailing shutter blades and to drive said trailing shutter blades to travel;
    a trailing blade brake lever which comes to abut on said driving lever nearly at the end of the turning movement of said driving lever, said brake lever being arranged to be pushed by said driving lever to make a turning motion to some degree and to brake the travel of said trailing shutter blades by a load resulting from said turning motion;
    a loading device which is arranged to give a load on said brake lever by coming into sliding contact with said brake lever; and
    a part serving as a center of the turning motion of said brake lever, said center of turning motion being set within the turning locus region of said driving lever.

12. A device according to claim 11, wherein said loading device includes a leaf spring member; and said leaf spring member is arranged to impose a load on said brake lever by coming into sliding contact with said brake lever.

13. A brake device of a shutter arranged to brake said shutter nearly at the end of the travel of loading blades and trailing blades of said shutter, comprising:
  (a) leading blade braking means for braking the leading blades of said shutter nearly at the end of the travel of said leading shutter blades, including:
    a leading blade driving lever which turns round accordingly as said leading shutter blades travels, said leading blade driving lever being arranged to be urged to turn round by an urging spring and to drive said leading shutter blades to travel through a leading blade arm which carries said leading shutter blades and is connected to said leading blade driving lever;
    a leading blade brake lever which comes to abut on said leading blade driving lever nearly at the end of the turning movement of said driving lever, said leading blade brake lever being arranged to be pushed to make a turning motion to some degree by said leading blade driving lever and to brake the travel of said leading shutter blades by a load resulting from said turning motion; and
    a leading blade loading device for imposing a load on said turning motion of said leading blade brake lever, said leading blade loading device being arranged to give a braking force which is greater in the initial stage thereof; and
  (b) trailing blade braking means, including:
    a trailing blade driving lever which turns round accordingly as said trailing shutter blades travel, said leading blade driving lever being arranged to be urged to turn round by an urging spring and to drive said trailing shutter blades to travel through a trailing blade arm which carries said trailing shutter blades and is connected to said driving lever;
    a trailing blade brake lever which comes to abut on said trailing blade driving lever nearly at the end of the turning movement of said trailing blade driving lever, said trailing blade brake lever being arranged to be pushed to make a turning motion to some degree by said trailing blade driving lever and to brake the travel of said trailing shutter blades by a load resulting from said turning motion; and
    a trailing blade loading device for imposing a load on said turning motion of said trailing blade brake lever, said trailing blade loading device being arranged to give a braking force which is smaller than that of said leading blade loading device in the initial stage thereof and gradually increases thereafter.

14. A device according to claim 13, wherein said trailing blade loading device includes a leaf spring member which is arranged to come into sliding contact with said trailing blade brake lever and is formed in such a shape that a sliding load imposed on said trailing blade brake lever is small in the initial stage of said sliding contact and comes to gradually increase.

15. A device according to claim 13, wherein said leading blade loading device includes a brake seat which is arranged to come into contact with said leading blade brake lever and to generate a frictional force when said lever makes said turning motion and a spring which is arranged to resiliently push said brake seat toward said leading blade brake lever and in the direction of the thickness of said seat, said spring being arranged to cause said leading blade brake lever to have a great initial load imposed thereon.

16. A device according to claim 14, wherein said leading blade loading device includes a brake seat which is arranged to come into contact with said leading blade brake lever and to generate a frictional force when said lever makes said turning motion and a spring which is arranged to resiliently push said brake seat toward said leading blade brake lever and in the direction of the thickness of said seat, said spring being arranged to cause said leading blade brake lever to have a great initial load imposed thereon.

17. A device according to claim 13, further comprising a stopper which is arranged to abut on said leading blade brake lever at the end of said turning motion of said lever, the part of said stopper abutting on said lever being made of a rubber material.

18. A device according to claim 13, further comprising a stopper which is arranged to abut on said trailing blade brake lever at the end of said turning motion of said trailing blade brake lever, a part of said stopper which abuts on said trailing blade brake lever being made of a rubber material.

19. A device according to claim 18, wherein a portion of said trailing blade brake lever which is located close to a part abutting on said stopper and on the side of a pivotal shaft is shaped narrower than other portion, so that kinetic energy obtained when said brake lever abuts on said stopper is absorbed.

20. A device according to claim 17, wherein a stopper which is arranged to abut on said trailing blade brake lever at the end of said turning motion of said trailing blade brake lever, a part of said stopper which abuts on said trailing blade brake lever being made of a rubber material.

21. A shutter having a leading blade driving lever, a trailing blade driving lever and a shutter charge lever which are turnably arranged approximately in a row on one side of a shutter aperture, comprising:
  (a) said leading blade driving lever and said trailing blade driving lever which are arranged on two sides of said shutter charge lever with said charge lever interposed in between said driving levers in a row;
  (b) a brake device for braking one of said driving levers which is arranged to cause shutter blades to travel from their preparatory positions by turning round toward said shutter charge lever, said brake device including a brake lever which brings about a load accordingly as said brake lever turns round, said brake lever being arranged to be pushed to make a turning motion to some degree by said one of driving levers when said driving lever comes near to the end of the turning movement thereof and to brake the turning movement of said one of driving levers with said load resulting from said turning motion, the center of the turning motion of said brake lever being set within the region of the turning movement locus of said one of driving levers.

22. A shutter according to claim 21, further comprising another brake device for the other driving lever, said another brake device including another brake lever, which brings about a load accordingly as said another brake lever turns round and is arranged to be pushed to make a turning motion to some degree by said other driving lever when said other driving lever comes near to the end of the turning movement thereof and to brake the turning movement of said other driving levers with said load resulting from said turning motion, the center of the turning motion of said another brake lever being set outside of the region of the turning movement locus of said other driving levers and set approximately on the extension of a line connecting said two driving levers.

23. A shutter according to claim 21, wherein said brake device includes a leaf spring member; and said one of driving levers, said brake lever and said leaf spring member are axially staggered.

* * * * *

UNITED STATES PATENT AND TRADEMARK OFFICE
CERTIFICATE OF CORRECTION

PATENT NO. : 4,829,329

DATED : May 9, 1989

INVENTOR(S) : Toyoda, et al.

It is certified that error appears in the above-identified patent and that said Letters Patent is hereby corrected as shown below:

COLUMN 1:

Line 35, change "beins" to --begins--.

Line 52, change "brake" to --the brake--.

Line 66, change "charateristic" to --characteristic--.

COLUMN 3:

Line 18, change "aperture" to --aperture part--.

Line 19, change "middle part" to --middle--.

COLUMN 5:

Line 63, change "bufer." to --buffer.--.

COLUMN 8:

Line 62, change "verical" to --vertical--.

UNITED STATES PATENT AND TRADEMARK OFFICE
CERTIFICATE OF CORRECTION

PATENT NO. : 4,829,329  Page 2 of 2

DATED : May 9, 1989

INVENTOR(S) : Toyoda, et al.

It is certified that error appears in the above-identified patent and that said Letters Patent is hereby corrected as shown below:

COLUMN 11:

Line 9, change "els," to --el,--.

Signed and Sealed this

Twentieth Day of March, 1990

Attest:

JEFFREY M. SAMUELS

Attesting Officer

Acting Commissioner of Patents and Trademarks